US010510362B2

(12) United States Patent
Hicks et al.

(10) Patent No.: US 10,510,362 B2
(45) Date of Patent: Dec. 17, 2019

(54) DIRECTIONAL CAPTURE OF AUDIO BASED ON VOICE-ACTIVITY DETECTION

(71) Applicant: Bose Corporation, Framingham, MA (US)

(72) Inventors: Matthew Ryan Hicks, Marlborough, MA (US); David Rolland Crist, Watertown, MA (US); Amir Reza Moghimi, Sutton, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 15/475,191

(22) Filed: Mar. 31, 2017

(65) Prior Publication Data

US 2018/0286433 A1 Oct. 4, 2018

(51) Int. Cl.

| | |
|---|---|
| ***G10L 25/84*** | (2013.01) |
| ***G10L 21/0232*** | (2013.01) |
| ***H04R 1/40*** | (2006.01) |
| ***H04R 3/00*** | (2006.01) |
| *G10L 21/0216* | (2013.01) |
| *G10L 15/08* | (2006.01) |
| *G10L 25/78* | (2013.01) |

(52) U.S. Cl.

CPC .......... *G10L 25/84* (2013.01); *G10L 21/0232* (2013.01); *H04R 1/406* (2013.01); *H04R 3/005* (2013.01); *G10L 25/78* (2013.01); *G10L 2015/088* (2013.01); *G10L 2021/02166* (2013.01); *H04R 2203/12* (2013.01); *H04R 2430/23* (2013.01)

(58) Field of Classification Search

None

See application file for complete search history.

(56) References Cited

U.S. PATENT DOCUMENTS

| | | | | |
|---|---|---|---|---|
| 5,473,701 | A * | 12/1995 | Cezanne ................ | H04R 1/406 381/92 |
| 8,351,630 | B2 | 1/2013 | Iclker et al. | |
| 8,358,798 | B2 | 1/2013 | Ickler et al. | |

(Continued)

FOREIGN PATENT DOCUMENTS

| | | |
|---|---|---|
| EP | 1 400 814 | 3/2004 |

OTHER PUBLICATIONS

U.S. Appl. No. 15/406,045, filed Jan. 13, 2017, Kim et al.

(Continued)

*Primary Examiner* — Abul K Azad

(74) *Attorney, Agent, or Firm* — Fish & Richardson P.C.

(57) ABSTRACT

The technology described in this document can be embodied in a computer-implemented method that includes receiving information representing audio captured by a microphone array, wherein the information includes multiple datasets each representing audio signals captured in accordance with a sensitivity pattern along a corresponding direction with respect to the microphone array. The method also includes computing, using one or more processing devices for each of the multiple datasets, one or more quantities indicative of human voice activity captured from the corresponding direction, and generating, based at least on the one or more quantities computed for a plurality of the multiple datasets, a directional audio signal representing audio captured from a particular direction.

21 Claims, 6 Drawing Sheets

(56) References Cited

U.S. PATENT DOCUMENTS

| | | | | |
|---|---|---|---|---|
| 8,447,055 | B2 | 5/2013 | Jankovsky et al. | |
| 9,432,769 | B1 * | 8/2016 | Sundaram | H04R 3/005 |
| 9,621,984 | B1 * | 4/2017 | Chu | H04R 1/406 |
| 9,820,036 | B1 * | 11/2017 | Tritschler | H04R 1/326 |
| 9,940,949 | B1 * | 4/2018 | Vitaladevuni | G10L 25/78 |
| 9,973,849 | B1 * | 5/2018 | Zhang | H04R 3/005 |
| 2003/0027600 | A1 | 2/2003 | Krasny et al. | |
| 2007/0244698 | A1 * | 10/2007 | Dugger | G10L 21/02 704/228 |
| 2010/0061568 | A1 * | 3/2010 | Rasmussen | H04R 3/005 381/94.1 |
| 2013/0142355 | A1 * | 6/2013 | Isaac | H04R 3/005 381/92 |
| 2013/0259254 | A1 * | 10/2013 | Xiang | G10K 11/175 381/73.1 |
| 2014/0093091 | A1 * | 4/2014 | Dusan | H04R 1/1083 381/74 |
| 2014/0093093 | A1 * | 4/2014 | Dusan | H04R 3/005 381/74 |
| 2015/0127338 | A1 * | 5/2015 | Reuter | G10L 15/20 704/233 |
| 2015/0201271 | A1 * | 7/2015 | Diethorn | H04R 1/10 381/375 |
| 2017/0214500 | A1 * | 7/2017 | Hreha | H04L 5/0023 |
| 2018/0102136 | A1 * | 4/2018 | Ebenezer | G10L 15/02 |
| 2018/0146306 | A1 * | 5/2018 | Benattar | H04R 25/407 |

OTHER PUBLICATIONS

Huang et al.; "A Novel Approach to Robust Speech Endpoint Detection in Car Environments"; 2000 IEEE International Conference, vol. 3, 4 pages.

Kellermann; "A Self-Steering Digital Microphone Army"; International Conference on Acoustics Speech & signal Processing; New York, NY; IEEE vol. CONF.16, Apr. 14, 1991; pp. 3581-3584.

International Search Report and Written Opinion; PCT/US2018/025080; dated Jun. 11, 2018; 15 pages.

* cited by examiner

DIRECTIONAL CAPTURE OF AUDIO BASED ON VOICE-ACTIVITY DETECTION

TECHNICAL FIELD

This disclosure generally relates to acoustic devices that include microphone arrays for capturing acoustic signals.

BACKGROUND

An array of microphones can be used for capturing acoustic signals along a particular direction.

SUMMARY

In one aspect, this document features a computer-implemented method that includes receiving information representing audio captured by a microphone array, wherein the information includes multiple datasets each representing audio signals captured in accordance with a sensitivity pattern along a corresponding direction with respect to the microphone array. The method also includes computing, using one or more processing devices for each of the multiple datasets, one or more quantities indicative of human voice activity captured from the corresponding direction, and generating, based at least on the one or more quantities computed for a plurality of the multiple datasets, a directional audio signal representing audio captured from a particular direction.

In another aspect, this document features an apparatus that includes a microphone array, one or more acoustic transducers configured to generate audio signals, and an audio processing engine that includes memory and one or more processing device. The audio processing engine is configured to receive information representing the audio captured by the microphone array, wherein the information includes multiple datasets each representing audio signals captured in accordance with a sensitivity pattern along a corresponding direction with respect to the microphone array. The audio processing engine is also configured to compute, for each of the multiple datasets, one or more quantities indicative of human voice activity captured from the corresponding direction, and generate, based at least on the one or more quantities computed for a plurality of the multiple datasets, a directional audio signal representing audio captured from a particular direction.

In another aspect, this document features one or more machine-readable storage devices having encoded thereon computer readable instructions for causing one or more processing devices to perform various operations. The operations include receiving information representing audio captured by a microphone array, wherein the information includes multiple datasets each representing audio signals captured in accordance with a sensitivity pattern along a corresponding direction with respect to the microphone array. The operations also include computing, for each of the multiple datasets, one or more quantities indicative of human voice activity captured from the corresponding direction, and generating, based at least on the one or more quantities computed for a plurality of the multiple datasets, a directional audio signal representing audio captured from a particular direction.

Implementations of the above aspects can include one or more of the following features. The information representing the audio captured by the microphone array can be received from a beamformer configured to process signals captured using the microphone array. Each of the multiple datasets can correspond to a beam generated using the beamformer. The beamformer can be one of: a fixed beamformer or a dynamic beamformer. The one or more quantities indicative of human voice activity can include a likelihood score of human voice activity in the audio signal represented in the dataset for the corresponding direction. The one or more quantities indicative of human voice activity can include a signal-to-noise ratio (SNR). The SNR can be computed as a ratio of a first quantity representing a voice signal and a second quantity representing non-voice signals. The one or more quantities indicative of human voice activity can represent a likelihood score of the presence of a keyword in the audio signal represented in the dataset for the corresponding direction. Generating the directional audio signal can include selecting one of the multiple datasets. Generating the directional audio signal can include causing a dynamic beamformer to capture audio in accordance with a sensitivity pattern generated for the particular direction.

Various implementations described herein may provide one or more of the following advantages. By steering a beamformer based on a direction of voice activity rather than a direction of the most dominant acoustic source, voice input may be accurately captured even in the presence of noise sources generating significant acoustic energy. In some cases, this may improve performance of a voice-activated device in the presence of dominant non-voice noise sources such as an air-conditioner. In some cases, the direction of relevant voice activity may also be determined via detecting the occurrence of a spoken keyword. This in turn may improve the performance of voice-activated devices in the presence of voice signals from multiple speakers.

Two or more of the features described in this disclosure, including those described in this summary section, may be combined to form implementations not specifically described herein.

The details of one or more implementations are set forth in the accompanying drawings and the description below. Other features, objects, and advantages will be apparent from the description and drawings, and from the claims.

DETAILED DESCRIPTION

Figure 1:
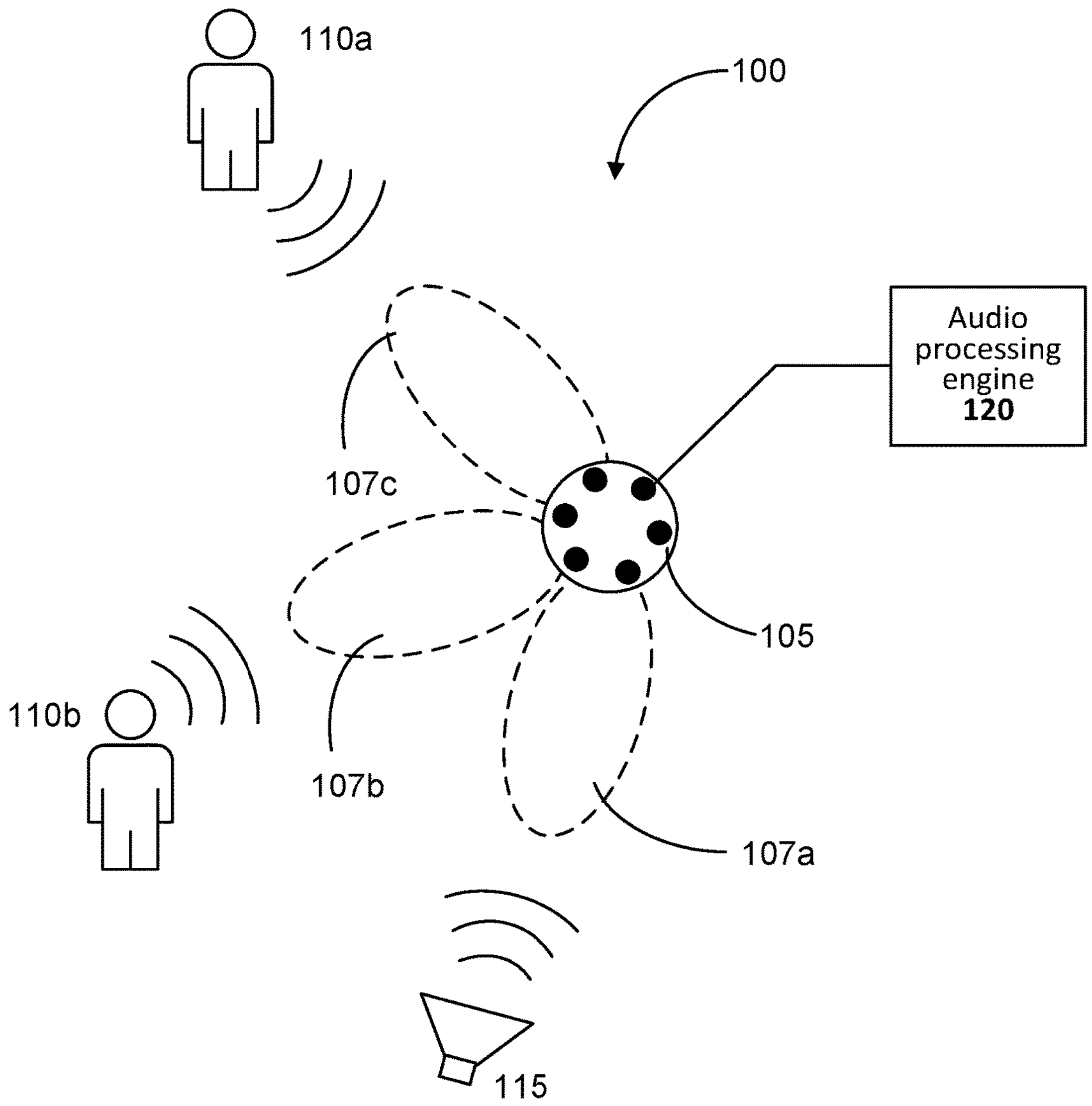
FIG. 1 is an example of an environment in which a voice-activated device may be disposed.

This document describes technology for controlling directional capture of audio based on voice activity detection. Various voice-activated devices that can be controlled using spoken commands are currently available. Examples of such devices that are commercially available include Echo® and FIRE TV® manufactured by Amazon Inc. of Seattle, Wash., various iOS® enabled devices manufactured by Apple Inc., and Google Home® and other Android® powered devices manufactured by Google Inc. of Mountain View, Calif. Voice activated devices can include an array (e.g., a linear array, a circular array, etc.) of microphones that are used for directional capture of spoken inputs. For example, the signals captured by the microphone array on a device can be processed to emphasize signals captured from a particular direction and/or deemphasize signals from one or more other directions. Such a process is referred to as beamforming, and the directional sensitivity pattern resulting from such a process may be referred to as a beam. A device executing the beamforming process may be referred to as a beamformer. Selection of a sensitivity pattern or beam along a particular direction may be referred to as beam steering.

In some cases, a beamformer may steer a beam in the direction of the dominant source of acoustic energy. In low-noise environments, where a human speaker is the dominant source of acoustic energy, the beamformer may accurately steer the beam towards the speaker. However, in some cases, where the dominant source of acoustic energy is a noise source, the beamformer may steer the beam towards that source, and as a result deemphasize the voice input from a human speaker. For example, if the microphone array is disposed near a loud sound source (e.g., an air conditioner, a humidifier, a dehumidifier, etc.), the beamformer may steer the beam towards that sound source. In such a case, a voice input coming from another direction may be inadvertently deemphasized. In some situations, when multiple speakers are present in an environment (e.g., a room where multiple people are speaking with one another), the dominant source of acoustic energy may be a person who is not providing a voice input that the microphone array needs to capture. Rather, the voice input may come from a direction that is different from the direction of the dominant source of acoustic energy. In these above mentioned situations, if the beam is steered based on the direction of the dominant noise source, a spoken input coming from another direction may be missed, which in turn may affect the performance of a corresponding voice-activated device adversely.

The technology described herein allows for controlling the direction of audio capture by a microphone array based on voice activity detection (VAD), which may include keyword spotting (KWS). For example, beam steering or otherwise controlling directional audio capture may be implemented based on preliminary outputs indicating the likelihood of presence of voice activity, or a particular keyword, in audio captured from a particular direction. These preliminary outputs may be referred to as soft-VAD outputs (for voice activity detection) or soft-KWS outputs (for keyword spotting), which may be used for determining a direction the captured audio from which is emphasized for subsequent processing. In some cases, determining the direction based on such soft-VAD outputs can help deemphasize acoustic signals originating from non-human dominant sound sources such as an air conditioner, humidifier, dehumidifier, vacuum cleaner, washer, dryer, or other machines or animals (e.g., pets). This in turn may improve the performance of an associated voice-activated device in such noisy environments. In some cases, determining the direction based on soft-KWS outputs may also improve the performance of a corresponding voice-activated device by accurately picking up a relevant voice command even when multiple other human speakers are speaking in the environment.

FIG. 1 is a schematic diagram of a system 100 that can be used for implementing the directional audio capture described herein. The system 100 includes an audio capture device 105 that can be used for capturing acoustic signals originating in the vicinity of the device. In some implementations, the audio capture device 105 includes an array of multiple microphones that are configured to capture acoustic signals originating from various sources in the vicinity of the device 105. For example, the audio capture device 105 can be used for capturing acoustic signals originating from a sound source such as one or more human speakers 110*a*, 110*b* (110, in general), or a non-human sound source 115 (e.g., an air conditioner, humidifier, dehumidifier, vacuum cleaner, washer, dryer, or other machines or animals). In some implementations, the audio capture device 105 can be disposed on or be a part of a voice-activated device that can be controlled based on the acoustic signals captured or picked up by the audio capture device 105. In some implementations, the audio capture device 105 can include a linear array where consecutive microphones in the array are disposed substantially along a straight line. In some implementations, the audio capture device 105 can include a non-linear array in which microphones are disposed in a substantially circular, oval, or another configuration. In the example shown in FIG. 1, the audio capture device 105 includes an array of six microphones disposed in a circular configuration.

Figure 2A:
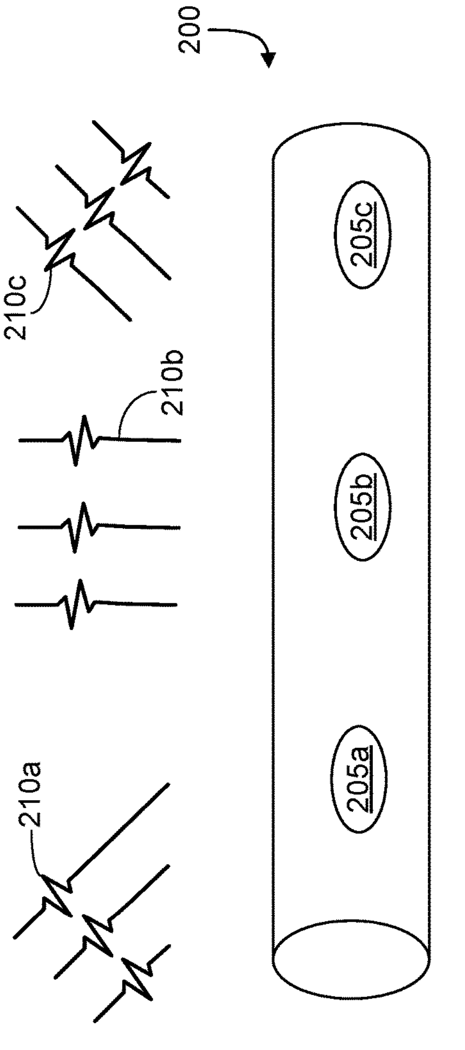
FIGS. 2A and 2B are examples of directional audio capture devices that may be used in conjunction with technology described herein.

Microphone arrays can be used for capturing acoustic signals along a particular direction. For example, signals captured by multiple microphones in an array may be processed to generate a sensitivity pattern that emphasizes the signals along a beam in the particular direction and suppresses or deemphasizes signals from one or more other directions. An example of such a device 200 is shown in FIG. 2A. The device 200 incudes multiple microphones 205 separated from one another by particular distances. The beamforming effect can be achieved by such an array of microphones. As illustrated in FIG. 2A, the direction from which a wavefront 210*a*, 210*b* or 210*c* (210, in general) originates can have an effect on the time at which the wavefront 210 meets each microphone 205 in the array. For example, a wavefront 210*a* arriving from the left at a 45° angle to the microphone array reaches the left hand microphone 205*a* first, and then the microphones 205*b* and 205*c*, in that order. Similarly, a wavefront 210*b* arriving at an angle perpendicular to the array reaches each microphone 205 at the same time, and a wavefront 210*c* arriving from the right at an angle of 45° to the microphone array reaches the right microphone 205*c* first, and then the microphones 205*b* and 205*a*, in that order. If an output of the microphone array is calculated, for example, by summing the signals, signals originating from a source located perpendicular to the array will arrive at the microphones 205 at the same time, and therefore reinforce each other. On the other hand, signals originating from a non-perpendicular direction arrive at the different microphones 205 at different times and therefore results in a lower output amplitude. The direction of arrival of a non-perpendicular signal can be calculated, for example, from the delay of arrival at the different microphones. Conversely, appropriate delays may be added to the signals captured by the different microphones to make the signals aligned to one another prior to summing. This may emphasize the signals from one particular direction, and can therefore be used to form a beam or sensitivity pattern along the particular direction without physically moving the antennas. The beamforming process described above is known as delay-sum beamforming.

Figure 2B:
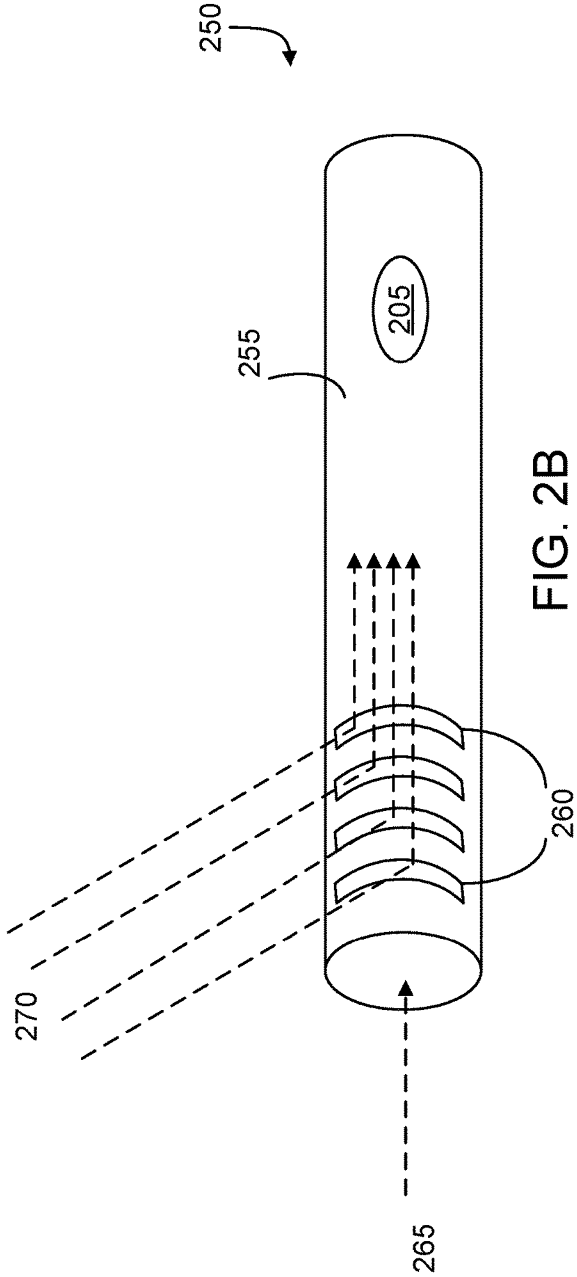

In some implementations, a directional audio capture device may also be realized using a single microphone together with a slotted interference tube. An example of such a device 250 is shown in FIG. 2B. The device 250 includes a single microphone 205 disposed within a tube 255 that includes multiple slots 260 that allow off-axis acoustic signals 270 to enter the tube 255. On-axis acoustic signals 265 enter the tube through the opening at one end of the tube 255. The desired on-axis acoustic signals 265 may propagate along the length of the tube to the microphone 205, while the unwanted off-axis acoustic signals 270 reaches the microphone 205 by entering the tube 255 through the slots 260 as shown in FIG. 2B. Because the off-axis acoustic signals 270 enter through the multiple slots 260, and the distances of the microphone from the different slots 260 are unequal, the off-axis acoustic signals 270 may arrive at the microphone with varying phase relationships that may partially cancel one another. Such destructive interference may cause at least a portion of the off-axis acoustic signals 270 to be attenuated relative to the on-axis acoustic signals 265, thereby yielding a sensitivity pattern that is more directional than what is possible using only the microphone 205. The tube 255 may be referred to as an interference tube, and the device 250 may be referred to as a shotgun (or rifle) microphone.

In some implementations, the microphone array on the audio capture device 105 can include directional microphones such as shotgun microphones described above. In some implementations, the audio capture device 105 can include a device that includes multiple microphones separated by passive directional acoustic elements disposed between the microphones. In some implementations, the passive directional acoustic elements include a pipe or tubular structure having an elongated opening along at least a portion of the length of the pipe, and an acoustically resistive material covering at least a portion of the elongated opening. The acoustically resistive material can include, for example, wire mesh, sintered plastic, or fabric, such that acoustic signals enter the pipe through the acoustically resistive material and propagate along the pipe to one or more microphones. The wire mesh, sintered plastic or fabric includes multiple small openings or holes, through which acoustic signals enter the pipe. The passive directional acoustic elements each therefore act as an array of closely spaced sensors or microphones. Various types and forms of passive directional acoustic elements may be used in the audio capture device 105. Examples of such passive directional acoustic elements are illustrated and described in U.S. Pat. Nos. 8,351,630, 8,358,798, and 8,447,055, the contents of which are incorporated herein by reference. Examples of microphone arrays with passive directional acoustic elements are described in co-pending U.S. application Ser. No. 15/406,045, titled "Capturing Wide-Band Audio Using Microphone Arrays and Passive Directional Acoustic Elements," the entire content of which is also incorporated herein by reference.

Data generated from the signals captured by the audio capture device 105 may be processed to generate a sensitivity pattern that emphasizes the signals along a "beam" in the particular direction and suppresses signals from one or more other directions. Examples of such beams or sensitivity patterns 107*a*-107*c* (107, in general) are depicted in FIG. 1. The beams or sensitivity patterns for the audio capture device 105 can be generated, for example, using an audio processing engine 120. For example, the audio processing engine 120 can include memory and one or more processing devices configured to process data representing audio information captured by the microphone array and generate one or more sensitivity patterns such as the beams 107. In some implementations, this can be done using a beamforming process executed by the audio processing engine 120. In such cases, the audio processing engine 120 may be referred to as a beamformer. One or more of (i) a fixed beamformer (that emphasizes captured acoustic signals along fixed discrete directions), and (ii) a dynamic beamformer (that emphasizes captured acoustic signals dynamically along a direction, or an approximation thereof, in accordance with a control input specifying such direction). The audio processing engine 120 may also be configured to execute VAD and/or KWS processes to implement a beam control system (described below in additional details) for controlling the operation of the beamformer.

The audio processing engine 120 can be located at various locations. In some implementations, the audio processing engine 120 may be disposed on the audio capture device 105 or on a voice-activated device associated with the audio capture device 105. In some such cases, the audio processing engine 120 may be disposed as a part of the audio capture device 105 or the associated voice-activated device. In some implementations, the audio processing engine 120 may be located on a device at a location that is remote with respect to the audio capture device 105. For example, the audio processing engine 120 can be located on a remote server, or on a distributed computing system such as a cloud-based system.

In some implementations, the audio processing engine 120 can be configured to process the data generated from the signals captured by the audio capture device 105 and generate audio data that emphasizes audio data captured along one or more directions relative to the audio capture device 105. In some implementations, the audio processing engine 120 can be configured to generate the audio data in substantially real-time (e.g., within a few milliseconds) such that the audio data is usable for real-time or near-real-time applications. The allowable or acceptable time delay for the real-time processing in a particular application may be governed, for example, by an amount of lag or processing delay that may be tolerated without significantly degrading a corresponding user-experience associated with the particular application. In some implementations, the audio data generated by the audio processing engine 120 can be transmitted, for example, over a network such as the Internet to a remote computing device configured to process the audio data. For example, the audio data generated by the audio processing engine may be sent to a remote server that analyzes the audio data to determine a voice command included in the audio data, and accordingly send back one or more control signals to a corresponding voice-activated device to affect the operation of such voice-activated device.

Figure 3A:
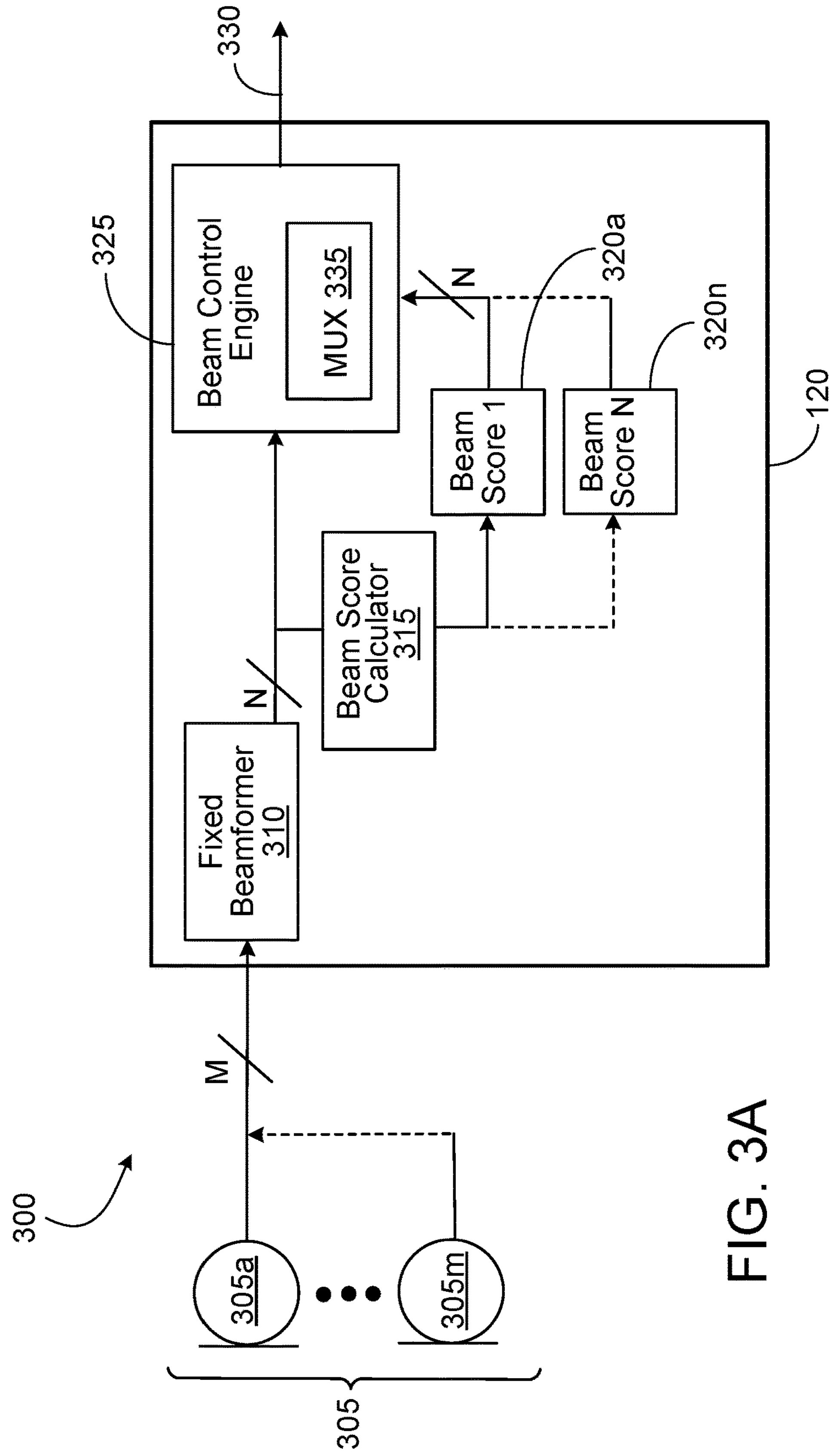
FIG. 3A is a schematic diagram of a beam-control system configured to control directional capture of audio signals using a fixed beamformer.

In some implementations, the audio processing engine 120 can be configured to control directional capture of acoustic signals by the microphone array based on calculating a likelihood of voice activity present along a given direction. An example system implementing such a control functionality is illustrated in FIG. 3A. Specifically, FIG. 3A is a schematic diagram of a beam-control system 300 configured to control directional capture of audio signals using a fixed beamformer. The system 300 includes multiple microphones 305*a*-305*m* (305 in general) disposed on an audio capture device 105. The microphones 305 are connected to the audio processing engine 120 that processes the signals from the microphones and generates an output signal

330 that represents emphasized acoustic signals from one or more directions. Such directional signals can then be used, for example, to control one or more operations of a voice-activated device.

In some implementations, the audio processing engine 120 includes a fixed beamformer 310 that generates emphasized directional signals corresponding to multiple directions with respect to the audio capture device 105. For example, the fixed beamformer 310 can be configured to generate N directional signals or beams based on acoustic signals captured by M microphones. M may be greater than, equal to, or less than N. Each of the N beams represents acoustic signals emphasized along a particular discrete direction with respect to the audio capture device 105.

The system 300 also includes a beam score calculator 315 that is configured to calculate a preliminary score for one or more of the N beams generated by the fixed beamformer 310. For example, the beam score calculator 315 may calculate beam scores 320*a*-320*n* (320, in general) corresponding to each of the N beams, respectively, generated by the fixed beamformer 310. In some implementations, the beam score calculator 315 is configured to calculate the preliminary score based on a likelihood of presence of voice activity long the corresponding direction of the beam. For example, the beam score calculator 315 can be configured to execute a VAD process on the data representing a particular beam, and generate a VAD score as the corresponding beam score 320. In some implementations, the beam score 320 may be a flag that indicates the presence or absence of human speech within the data corresponding to the particular beam.

A VAD process can be used to identify if there is human speech present in the input audio data corresponding to a particular beam. In some implementations, if human speech is present in the data corresponding to a particular beam, the beam score calculator 315 executing the VAD process generates a discrete flag that indicates the presence of such speech, such that one or more actions can be taken based on the flag. Examples of such actions include turning on or off further processing, injection of comfort noise, gating audio pass-through, etc. In some implementations, the beam score calculator 315 can be configured to compute a beam score 320 based on the probability of human speech being present in the audio stream corresponding to the particular beam. Such a beam score 320 may be referred to as a soft-VAD score. Various types of VAD processes may be used in computing such soft-VAD scores. One example of such a process is described in the reference: Huang, Liang-sheng and Chung-ho Yang. "A novel approach to robust speech endpoint detection in car environments." *Acoustics, Speech, and Signal Processing,* 2000. *ICASSP'*00. *Proceedings.* 2000 *IEEE International Conference on*. Vol. 3. IEEE, 2000, the entire content of which is incorporated herein by reference.

In some implementations, the multiple soft-VAD scores corresponding to the different beams may be compared to determine the one or more directions along which a human speech source is likely present. One or more beams corresponding to such directions may then be selected as the direction(s) of interest for further processing. For example, a beam control engine 325 can be used to analyze the beam scores 320 (e.g., the soft-VAD scores) to focus on one or more directions of interest that correspond to high beam scores. The one or more directions of interest may be selected in various ways. In some implementations, the beam control engine 325 can include a multiplexer 335 that is configured to select one of the multiple beams generated by the beamformer. For example, if the beam control engine 325 determines that a particular beam score (e.g., 320*a*) is higher than the other beam scores, the beam control engine 325 may instruct the multiplexer 335 (e.g., using a control signal) to select the data corresponding to the particular beam (beam 1, in this example) for further processing. In some implementations, more than one beam may also be selected for further processing. For example, if the beam scores 320 corresponding to two particular beams are close to one another, but each substantially higher than the other beam scores, the data corresponding to the two particular beams may be selected for further processing.

Figure 3B:
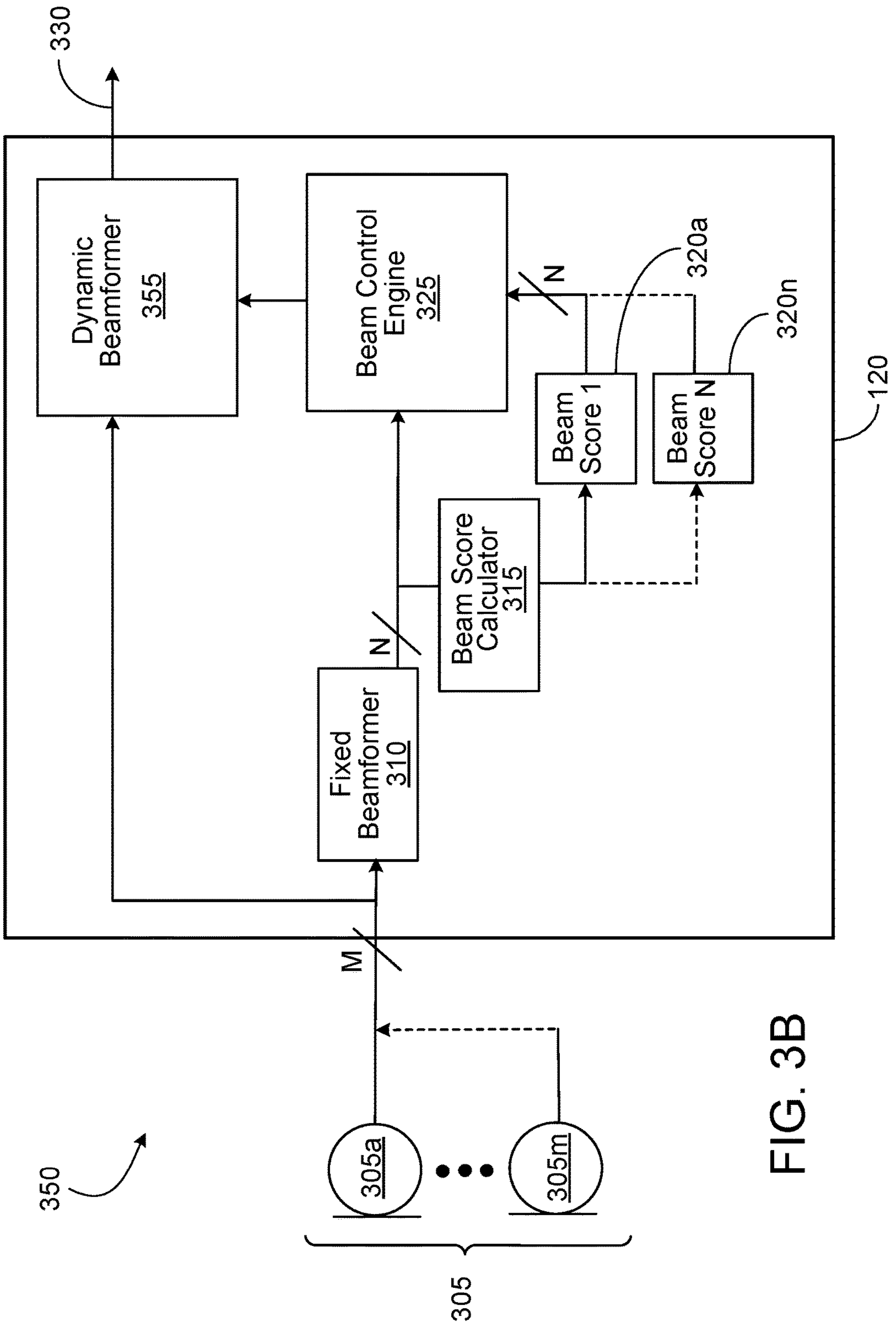
FIG. 3B is a schematic diagram of a beam-control system configured to control directional capture of audio signals using a dynamic beamformer.

In some implementations, the one or more directions of interest may also be selected using a dynamic beamformer that is configured to generate a new dynamic-beam based on, for example, the spatial information indicated by the soft-VAD scores. An example of such a system 350 is depicted in FIG. 3B, wherein the audio processing engine 120 includes a dynamic beamformer 355. The input received from the M microphones are provided to the dynamic beamformer 355, which is controlled by the beam control engine 325. In some implementations, if the soft-VAD scores corresponding to one or more directions are higher than the rest, the beam control engine 325 can be configured to control the dynamic beamformer 355 to dynamically generate a beam corresponding to the one or more directions. Examples of a dynamic or adaptive beamformer 355 include a Frost beamformer and a Griffiths-Jim beamformer.

Figure 3C:
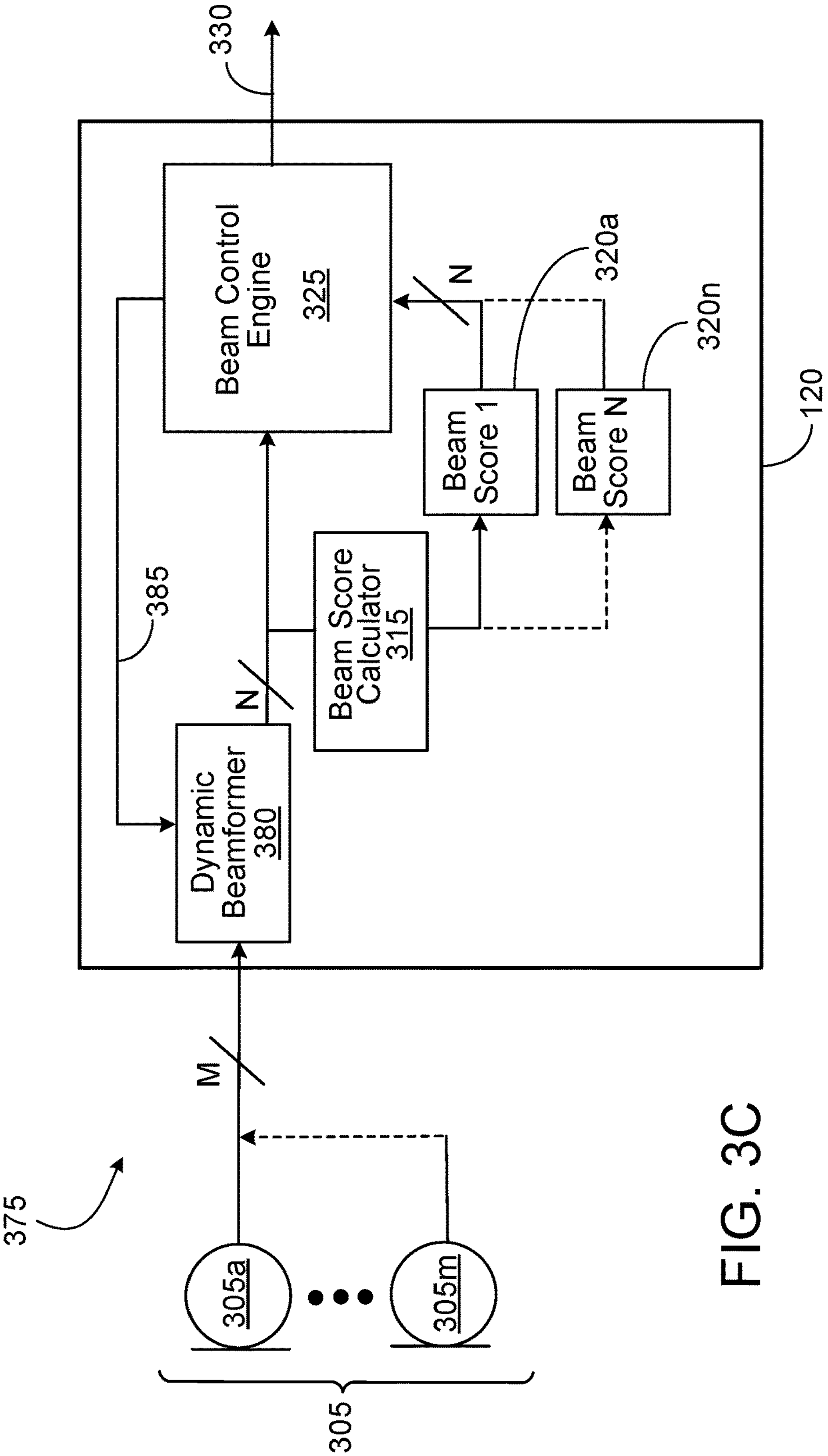
FIG. 3C is a schematic diagram of a beam-control system configured to control directional capture of audio signals using a dynamic beamformer controlled using a feedback loop.

In some implementations, a dynamic beamformer may be used without a fixed beamformer. An example of such a system is shown in FIG. 3C, which shows a schematic diagram of a beam-control system 375 configured to control directional capture of audio signals using a dynamic beamformer 380 that is controlled using a feedback loop. In such implementations, the dynamic beamformer initially generates multiple beams that are evaluated by the beam score calculator 315 to generate the corresponding beam scores 320. Based on the beam scores 320, the beam control engine 325 can provide one or more control signals to the dynamic beamformer 380 over the feedback path 385 to generate the one or more beams of interest. In some implementations, the data corresponding to the one or more beams of interests are then passed through the beam control engine 325 and provided as the output signal 330.

The description above primarily uses soft-VAD scores as examples of beam scores 320. However, other types of beam scores 320 are also possible. For example, a beam score 320 can include a signal to noise ratio (SNR), wherein the signal represents a voice activity of interest, and the noise represents other unwanted signals such as non-voice acoustic signals as well as undesired voice signals. The SNR may be calculated as a ratio of a first quantity (e.g., amplitude, power etc.) representing the voice signal of interest, and a second quantity (e.g., amplitude, power, etc.) representing the noise. In some implementations, the beam score calculator 315 can execute a KWS process to generate soft-KWS scores as the beam scores 320. A KWS process can be used to determine if a specified phrase, or a set of one or more "keywords," is present in a data stream corresponding to a particular beam. In some implementations, if the phrase or set of keywords is present, a flag can be set, and one or more actions may be taken based on whether the flag is set. Examples of keywords or phrases that are used in commercially available systems include "OK Google" used for Google Home® and other Android® powered devices manufactured by Google Inc. of Mountain View, Calif., "Hey Siri" used for iOS® enabled devices manufactured by Apple Inc. of Cupertino, Calif., “Alexa” used for Echo® and FIRE TV® devices manufactured by Amazon Inc. of Seattle, Wash. The beam score calculator 315 can be configured to use a soft-KWS process to generate a beam score 320 indicative of a likelihood that a particular phrase is present in the data corresponding to a beam. Such beam scores may be referred to as soft-KWS scores, which can then be used, analogous to how the soft-VAD scores are used to select one or more directions of interest. Upon identifying the one or more directions of interest, the beam control engine 325 can be configured to select a beam generated by a fixed beamformer or cause a dynamic beamformer to generate a dynamic-beam for the one or more directions of interest.

In some implementations, the beam score calculator 315 may be configured to calculate both a soft-VAD score and a soft-KWS score. In such cases, the beam control engine 325 may control a beamformer based on both scores. For example, in an environment where multiple human speakers are present, a soft-KWS score may be used for determining an initial direction of a particular speaker, and then if the particular speaker changes position, a soft-VAD score calculated based on the particular user’s voice may be used for controlling the beamformer in accordance with the particular user’s position. In some implementation, once the particular speaker is identified (using for example, a soft-KWS score), one or more characteristics of the particular speaker’s voice may be identified in determining which voice to use in calculating the soft-VAD scores. In some implementations, an initial direction or beam may be selected based on a soft-KWS score, and then the soft-VAD scores may be used to “follow” the voice corresponding to the initial direction even as that voice changes position. In some implementations, where both a soft-VAD score as well as a soft-KWS score are available, a combined score may be calculated for each beam as a weighted combination of the two scores. In some implementations, one score may be preferred over the other. For example, a soft-VAD score may be used if no keyword is detected (as indicated, for example, by the absence of a soft-KWS score, or by the soft-KWS score being below a threshold), but the soft-KWS score may be preferred over the soft-VAD score when a keyword is detected.

Figure 4:
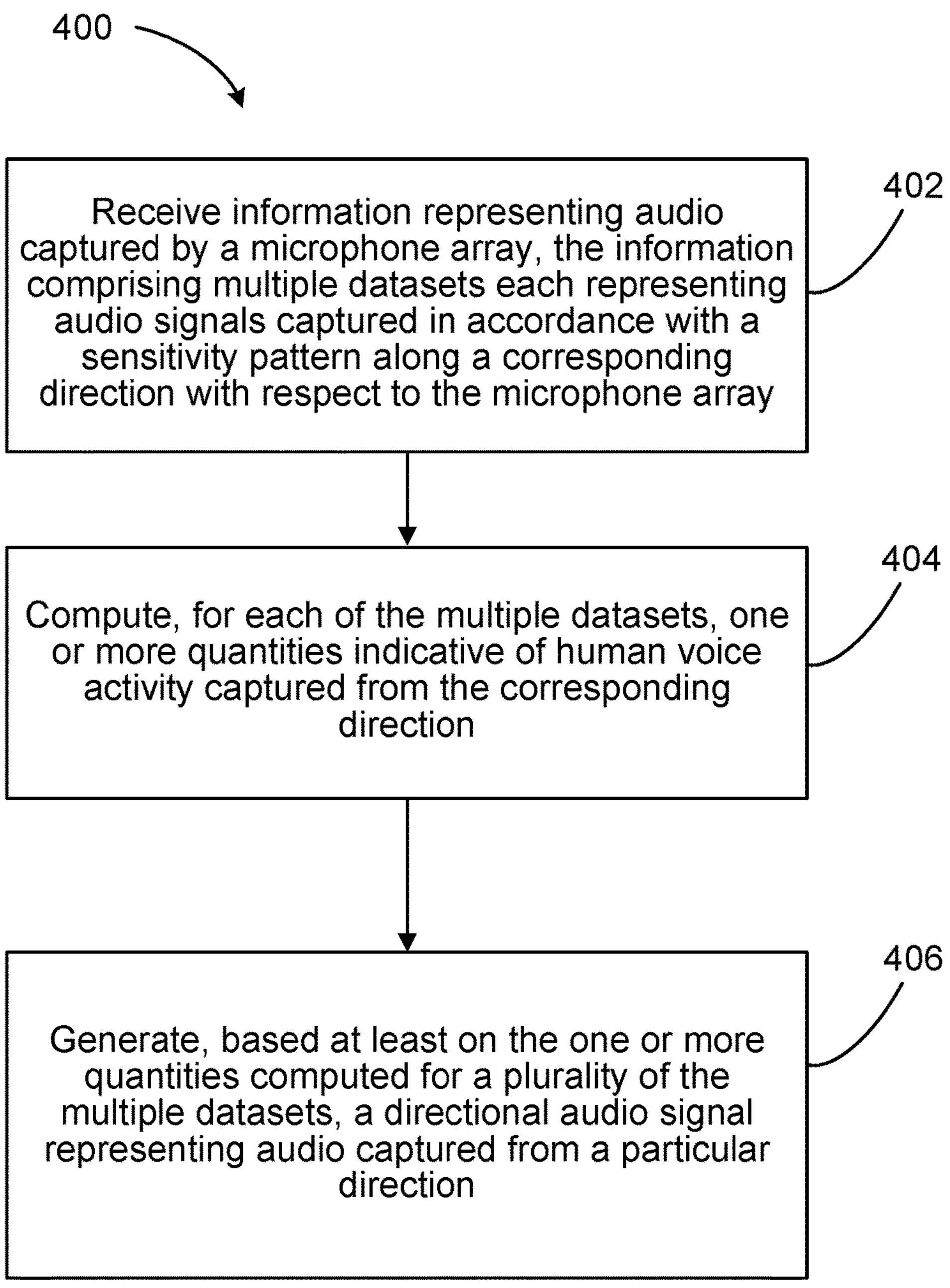
FIG. 4 is a flowchart of an example process for capturing directional audio in accordance with the technology described herein.

FIG. 4 is a flowchart of an example process 400 for capturing directional audio in accordance with the technology described herein. In some implementations, the process 400 may be performed, at least in part, by the audio processing engine 120 described above. Operations of the process 400 includes receiving information representing audio captured by a microphone array (402). The information can include multiple datasets each representing audio signals captured in accordance with a sensitivity pattern along a corresponding direction with respect to the microphone array. The sensitivity pattern can be substantially similar to a beam generated by a beamformer such as a fixed beamformer or dynamic beamformer. In some implementations, the beamformer processes the signals captured by the microphone array to generate the information including the multiple datasets and provides the information to the audio processing engine 120. In some implementations, the beamformer is a part of the audio processing engine.

Operations of the process 400 also includes computing, for each of the multiple datasets, one or more quantities indicative of human voice activity captured from the corresponding direction (404). In some implementations, the one or more quantities can be computed by a beam score calculator 315 described above. The one or more quantities indicative of human voice activity can include, for example, a likelihood score of human voice activity in the audio signal represented in the dataset for the corresponding direction. Such a likelihood score may be computed, for example, with the help of a voice activity detector. The one or more quantities indicative of human voice activity can also include a signal to noise ratio (SNR), wherein the signal is voice activity of interest, and the noise is other unwanted signals including non-voice acoustic signals as well as undesired voice signals. The SNR may be calculated as a ratio of a first quantity (e.g., amplitude, power etc.) representing the voice signal of interest, and a second quantity (e.g., amplitude, power, etc.) representing the noise. In some implementations, the one or more quantities indicative of human voice activity can be substantially similar to the beam scores 320 described above, including, for example, soft-VAD and soft-KWS scores. In some implementations, the one or more quantities indicative of human voice activity can represent a likelihood score of the presence of a keyword in the audio signal represented in the dataset for the corresponding direction.

The process 400 includes generating, based at least on the one or more quantities computed for a plurality of the multiple datasets, a directional audio signal representing audio captured from a particular direction (406). In some implementations, generating the directional audio signal includes selecting one of the multiple datasets. For example, if a fixed beamformer is used to generate the multiple datasets, generating the directional audio signal can include selecting one of the multiple datasets generated by the fixed beamformer. In some implementations, generating the directional audio signal can include causing a dynamic beamformer to capture audio in accordance with a sensitivity pattern generated for the particular direction.

The audio captured in accordance with the sensitivity pattern generated for the particular direction can be used for various purposes. In some implementations, signals generated based on the captured audio may be used in various speech processing applications including, for example, speech recognition, speaker recognition, speaker verification, or another speech classification. In some implementations, the device executing the process 400 (e.g., the audio processing engine 120 or another device or apparatus that includes the audio processing engine) can include a speech processing engine to implement one or more of the speech processing applications mentioned above. In some implementations, the device executing the process 400 may transmit information based on the captured audio to one or more remote computing device (e.g., servers associated with a cloud-based system) providing speech processing services. In some implementations, one or more control signals for operating a voice-activated device can be generated based on processing the audio captured in accordance with the sensitivity pattern generated for the particular direction.

The functionality described herein, or portions thereof, and its various modifications (hereinafter “the functions”) can be implemented, at least in part, via a computer program product, e.g., a computer program tangibly embodied in an information carrier, such as one or more non-transitory machine-readable media or storage device, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). In some implementations, at least a portion of the functions may also be executed on a floating point or fixed point digital signal processor (DSP) such as the Super Harvard Architecture Single-Chip Computer (SHARC) developed by Analog Devices Inc.

Processing devices suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Other embodiments and applications not specifically described herein are also within the scope of the following claims. For example, the parallel feedforward compensation may be combined with a tunable digital filter in the feedback path. In some implementations, the feedback path can include a tunable digital filter as well as a parallel compensation scheme to attenuate generated control signal in a specific portion of the frequency range.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A method comprising:

receiving information representing audio captured by a microphone array, responsive to receiving the information, generating by a first beamformer, a first set of multiple directional audio signals each corresponding to a specific emphasized direction with respect to the microphone array;

computing, using one or more processing devices for each of the multiple directional audio signals, one or more quantities indicative of human voice activity captured from the corresponding direction;

determining, based on the one or more quantities, that an amount of human voice activity captured from a first direction is more than an amount of human voice activity captured from a second direction, whereas an amount of acoustic energy captured from the first direction is less than an amount of acoustic energy captured from the second direction; and generating, responsive to determining that the amount of human voice activity captured from the first direction is more than the amount of human voice activity captured from the second direction, an additional directional audio signal distinct from the first set of multiple directional audio signals, the additional directional audio signal being generated by a second beamformer that emphasizes capture of human voice activity from the first direction as compared to audio captured from the second direction, wherein the second beamformer is a dynamic beamformer that operates, at least in part, based on an input signal received from the first beamformer.

2. The method of claim 1, wherein the first beamformer is configured to process signals captured by the microphone array.

3. The method of claim 2, wherein each of the multiple directional audio signals corresponds to a beam generated by the first beamformer.

4. The method of claim 2, wherein the first beamformer is one of: a fixed beamformer or a dynamic beamformer.

5. The method of claim 1, wherein the one or more quantities indicative of human voice activity comprise a likelihood score of human voice activity in the directional audio signal for the corresponding emphasized direction.

6. The method of claim 1, wherein the one or more quantities indicative of human voice activity comprise a signal-to-noise ratio (SNR).

7. The method of claim 6, wherein the SNR is computed as a ratio of a first quantity representing a voice signal and a second quantity representing non-voice signals.

8. The method of claim 1, wherein the one or more quantities indicative of human voice activity represents a likelihood score of the presence of a keyword in the directional audio signal for the corresponding emphasized direction.

9. The method of claim 1, wherein the amount of human voice activity captured from the first direction is an amount of human voice activity corresponding to a particular speaker captured from the first direction, and wherein the amount of human voice activity captured from the second direction is an amount of human voice activity corresponding to the particular speaker captured from the second direction.

10. An apparatus comprising:

a microphone array;

one or more acoustic transducers configured to generate audio signals; and an audio processing engine including memory and one or more processing devices configured to:

receive information representing the audio captured by the microphone array, responsive to receiving the information, generate by a first beamformer, a first set of multiple directional audio signals each corresponding to a specific emphasized direction with respect to the microphone array, compute, for each of the multiple directional audio signals, one or more quantities indicative of human voice activity captured from the corresponding direction, determine, based on the one or more quantities, that an amount of human voice activity captured from a first direction is more than an amount of human voice activity captured from a second direction, whereas an amount of acoustic energy captured from the first direction is less than an amount of acoustic energy captured from the second direction, and generate, responsive to determining that the amount of human voice activity captured from the first direction is more than the amount of human voice activity captured from the second direction, an additional directional audio signal distinct from the first set of multiple directional audio signals, the additional directional audio signal being generated by a second beamformer that emphasizes capture of human voice activity from the first direction as compared to audio captured from the second direction, wherein the second beamformer is a dynamic beamformer that operates, at least in part, based on an input signal received from the first beamformer.

11. The apparatus of claim 10, wherein the first beamformer is configured to process signals captured by the microphone array.

12. The apparatus of claim 11, wherein each of the multiple directional audio signals corresponds to a beam generated by the first beamformer.

13. The apparatus of claim 11, wherein the first beamformer is one of: a fixed beamformer or a dynamic beamformer.

14. The apparatus of claim 10, wherein the one or more quantities indicative of human voice activity comprise a likelihood score of human voice activity in the directional audio signal for the corresponding emphasized direction.

15. The apparatus of claim 10, wherein the one or more quantities indicative of human voice activity comprise a signal-to-noise ratio (SNR).

16. The apparatus of claim 15, wherein the SNR is computed as a ratio of a first quantity representing a voice signal and a second quantity representing non-voice signals.

17. The apparatus of claim 10, wherein the one or more quantities indicative of human voice activity represents a likelihood score of the presence of a keyword in the directional audio signal for the corresponding emphasized direction.

18. The apparatus of claim 10, wherein the amount of human voice activity captured from the first direction is an amount of human voice activity corresponding to a particular speaker captured from the first direction, and wherein the amount of human voice activity captured from the second direction is an amount of human voice activity corresponding to the particular speaker captured from the second direction.

19. One or more machine-readable storage devices having encoded thereon computer readable instructions for causing one or more processing devices to perform operations comprising:

receiving information representing audio captured by a microphone array, responsive to receiving the information, generating by a first beamformer, a first set of multiple directional audio signals each corresponding to a specific emphasized direction with respect to the microphone array;

computing, for each of the multiple directional audio signals, one or more quantities indicative of human voice activity captured from the corresponding direction;

determining, based on the one or more quantities, that an amount of human voice activity captured from a first direction is more than an amount of human voice activity captured from a second direction, whereas an amount of acoustic energy captured from the first direction is less than an amount of acoustic energy captured from the second direction; and generating, responsive to determining that the amount of human voice activity captured from the first direction is more than the amount of human voice activity captured from the second direction, an additional directional audio signal distinct from the first set of multiple directional audio signals, the additional directional audio signal being generated by a second beamformer that emphasizes capture of human voice activity from the first direction as compared to audio captured from the second direction, wherein the second beamformer is a dynamic beamformer that operates, at least in part, based on an input signal received from the first beamformer.

20. The one or more machine-readable storage devices of claim 19, wherein the amount of human voice activity captured from the first direction is an amount of human voice activity corresponding to a particular speaker captured from the first direction, and wherein the amount of human voice activity captured from the second direction is an amount of human voice activity corresponding to the particular speaker captured from the second direction.

21. The one or more machine-readable storage devices of claim 19, wherein the one or more quantities indicative of human voice activity represents a likelihood score of the presence of a keyword in the directional audio signal for the corresponding emphasized direction.

* * * * *